(12) United States Patent
Li et al.

(10) Patent No.: US 9,316,209 B2
(45) Date of Patent: Apr. 19, 2016

(54) MOVEMENT INHIBITING APPARATUS FOR FLOATING OFFSHORE WIND TURBINE AND FLOATING BASE USED FOR OFFSHORE WIND TURBINE

(71) Applicant: XINJIANG GOLDWIND SCIENCE & TECHNOLOGY CO., LTD., Urumqi (CN)

(72) Inventors: Rongfu Li, Beijing (CN); Haifei Zhu, Beijing (CN); Luolin Bai, Beijing (CN); Lei Shi, Beijing (CN)

(73) Assignee: XINJIANG GOLDWIND SCIENCE & TECHNOLOGY CO., LTD., Urumqi (CN)

( * ) Notice: Subject to any disclaimer, the term of this patent is extended or adjusted under 35 U.S.C. 154(b) by 0 days.

(21) Appl. No.: 14/363,403

(22) PCT Filed: Dec. 21, 2012

(86) PCT No.: PCT/CN2012/087142
§ 371 (c)(1),
(2) Date: Jun. 6, 2014

(87) PCT Pub. No.: WO2013/091567
PCT Pub. Date: Jun. 27, 2013

(65) Prior Publication Data
US 2014/0345510 A1  Nov. 27, 2014

(30) Foreign Application Priority Data

Dec. 23, 2011  (CN) .......................... 2011 1 0440041

(51) Int. Cl.
*B63B 39/06* (2006.01)
*F03D 11/04* (2006.01)
*B63B 35/44* (2006.01)

(52) U.S. Cl.
CPC .............. *F03D 11/045* (2013.01); *B63B 35/44* (2013.01); *B63B 39/06* (2013.01); *F03D 11/04* (2013.01);
(Continued)

(58) Field of Classification Search
CPC ........ B63B 39/06; F03D 11/04; F03D 11/045
USPC ........................ 114/126, 264, 125; 405/195.1
See application file for complete search history.

(56) References Cited

U.S. PATENT DOCUMENTS

| 3,224,401 A | 12/1965 | Kobus |
| 3,224,402 A | 12/1965 | Kobus |

(Continued)

FOREIGN PATENT DOCUMENTS

| CN | 1207072 A | 2/1999 |
| CN | 1857961 A | 11/2006 |

(Continued)

OTHER PUBLICATIONS

International Search Report dated Mar. 21, 2013 corresponding to PCT/CN2012/087142 with English translation, 8 pp.
(Continued)

*Primary Examiner* — Lars A Olson
(74) *Attorney, Agent, or Firm* — Ohlandt, Greeley, Ruggiero & Perle, L.L.P.

(57) ABSTRACT

A movement inhibiting apparatus for a floating offshore wind turbine and a floating base with the apparatus. The movement inhibiting apparatus for the floating offshore wind turbine comprises at least one layer of an annular shake-reducing panel placed horizontally and surrounding the floating base. A plurality of shake-reducing fins is further arranged on the shake-reducing panel. The plurality of shake-reducing fins comprises a first set of shake-reducing fins arranged on one side of the shake-reducing panel and the shake-reducing fins of the first set are spaced apart vertically around the floating base. The movement inhibiting apparatus for the floating offshore wind turbine can effectively inhibit the movement of the floating wind turbine and is of low cost.

16 Claims, 6 Drawing Sheets

(52) U.S. Cl.
CPC ..... *B63B 2035/446* (2013.01); *B63B 2039/067* (2013.01); *F05B 2240/95* (2013.01); *F05B 2260/964* (2013.01); *Y02E 10/727* (2013.01)

(56) References Cited

U.S. PATENT DOCUMENTS

| | | | |
|---|---|---|---|
| 3,299,846 A | | 1/1967 | Jarlan |
| 3,382,834 A | * | 5/1968 | Lewis ................. B63B 39/03 114/125 |
| 4,004,536 A | | 1/1977 | Bernier |
| 4,982,681 A | * | 1/1991 | Jarlan ........................ 114/264 |
| 6,102,625 A | | 8/2000 | Olsen et al. |
| 8,057,127 B2 | * | 11/2011 | Lopez et al. ................. 114/264 |
| 2010/0219645 A1 | | 9/2010 | Yamamoto et al. |

FOREIGN PATENT DOCUMENTS

| | | |
|---|---|---|
| CN | 2900352 Y | 5/2007 |
| CN | 101475048 A | 7/2009 |
| CN | 201347195 Y | 11/2009 |
| CN | 102146873 A | 8/2011 |
| CN | 102490876 A | 6/2012 |
| EP | 1 719 697 A1 | 11/2006 |
| JP | 61119489 | 6/1986 |

OTHER PUBLICATIONS

Extended European Search Report dated Jul. 15, 2015 from corresponding European Patent Application No. 12861025.0, 7 pages.

* cited by examiner

MOVEMENT INHIBITING APPARATUS FOR FLOATING OFFSHORE WIND TURBINE AND FLOATING BASE USED FOR OFFSHORE WIND TURBINE

The present application is the national phase of International Application No. PCT/CN2012/087142, titled "MOVEMENT INHIBITING APPARATUS FOR FLOATING OFFSHORE WIND TURBINE AND FLOATING BASE USED FOR OFFSHORE WIND TURBINE", filed on Dec. 21, 2012, which claims the benefit of priority to Chinese Patent Application No. 201110440041.9, entitled "MOVEMENT INHIBITING APPARATUS FOR FLOATING OFFSHORE WIND TURBINE AND FLOATING BASE USED FOR OFFSHORE WIND TURBINE", filed with the Chinese State Intellectual Property Office on Dec. 23, 2011, both of which applications are incorporated herein in their entireties by this reference.

BACKGROUND

1. Field of the Disclosure

The present application relates to an offshore wind turbine, and particularly to a motion suppression device for a floating offshore wind turbine configured to suppress the swinging motion of the offshore wind turbine around a vertical axis, and a floating foundation for the offshore wind turbine having the motion suppression device for the offshore wind turbine.

2. Discussion of the Background Art

An offshore wind turbine generally employs a gravity foundation, a monopile foundation, a jacket foundation, a tripod foundation, a suction caisson foundation, or a floating foundation according to a depth of seawater and seabed geological conditions. Among all these foundation types, the floating foundation is not restricted by the seabed conditions and is applicable to an offshore wind farm having a water depth greater than 50 meters, thus the floating foundation is a promising technique which has a bright prospect for wide application.

Floating platforms in the marine industry and the offshore oil industry are similar to the floating foundation for the offshore wind turbine.

At present, an anti-roll device in the marine industry mainly includes a fin stabilizer, a bilge keel, an anti-roll tank, an anti-roll rudder, and so on, and the fin stabilizer, the bilge keel, and the anti-roll rudder may keep the ship stable by using the lift force of fluid acting on these structures during the navigation. The faster the ship travels the more stable the ship is. The anti-roll tank may keep the ship stable by using a pressure difference between ballast water in side tanks of larboard and starboard to offset an overturning moment of the ship.

A motion suppression device for the floating platform of the offshore oil projects mainly includes a damping plate for truss-spar and a stabilizing plate for floating bodies such as an FPSO.

However, the foundation for the floating offshore wind turbine bears loads quite different from the floating platforms in the traditional marine industry and offshore oil industry. In addition to combined loads from wind and wave, the foundation for the floating offshore wind turbine is also subject to a gyro revolving effect resulting from the operation of the wind turbine of a high-rise structure. The gyro revolving effect may generate overturning moments Mx and My and a torque Mz about a vertical axis on the foundation, and cause violent motions of the whole wind turbine in six degrees of freedom, including axial motions along axes X, Y, and Z and swinging motions about these axes, which may bring a tremendous challenge for a pitch and yaw control system of the wind turbine, and adversely affect the normal operation of the wind turbine, reduce the generated energy, or even endanger the structural safety of the whole system.

The foundation for the floating wind turbine is structurally different from the floating platform in the marine industry, and the loads, produced in the operation of machines carried on the foundation for the floating wind turbine is also different from that of the floating platform in the marine industry. At present, there is no effective motion suppression device specifically designed for overall motion of the floating offshore wind turbine. Therefore, it is necessary to provide a device for suppressing the motion of the floating wind turbine in six degrees of freedom.

SUMMARY

The present application intends to provide a motion suppression device for suppressing the motion of a floating offshore wind turbine, and a floating foundation for the offshore wind turbine having the motion suppression device.

A motion suppression device for a floating offshore wind turbine is provided, wherein the floating offshore wind turbine has a floating foundation, and the motion suppression device includes at least one annular stabilizing plate arranged horizontally surrounding the floating foundation.

The stabilizing plate is provided with a plurality of fin stabilizers including a first group of fin stabilizers arranged on one side of the stabilizing plate, and the first group of fin stabilizers are arranged vertically surrounding the floating foundation and spaced apart from each other.

The plurality of fin stabilizers further include a second group of fin stabilizers arranged on the other side of the stabilizing plate, and the second group of fin stabilizers are arranged vertically surrounding the floating foundation and spaced apart from each other.

Each fin stabilizer in the first group is deflected by a first angle in a width direction with respect to a straight line passing through a center of the floating foundation and an inner endpoint of the fin stabilizer.

Each fin stabilizer in the first group is deflected by a first angle in a width direction with respect to a straight line passing through a center of the floating foundation and an inner endpoint of the fin stabilizer, and each fin stabilizer in the second group is deflected by a second angle in a width direction with respect to the straight line passing through the center of the floating foundation and the inner endpoint of the fin stabilizer.

The first angle and the second angle may be equal.

A deflection direction of the first group of fin stabilizers may be opposite to a deflection direction of the second group of fin stabilizers.

The first angle may be greater than 0 degree and less than 45 degree, preferably range from 5 degree to 10 degree.

The first angle may be greater than 0 degree and less than 45 degree, and the second angle may range from 1 degree to 15 degree.

The first angle may range from 5 degree to 10 degree and the second angle may range from 5 degree to 10 degree.

The fin stabilizers may each have an L-shaped cross section.

The fin stabilizers may each be provided with a stiffener.

The fin stabilizers may have a flat surface or a curved surface.

The stiffener of the fin stabilizer may include at least one of a horizontal stiffener, an inclined stiffener, or a vertical stiffener.

A stiffener may be provided on a surface of the stabilizing plate.

The stabilizing plate may have a flat surface or a curved surface.

The stabilizing plate may be provided with evenly distributed spoiler holes.

A permeability, caused by the spoiler holes, of the stabilizing plate may range from 5% to 30%.

A permeability, caused by the spoiler holes, of the stabilizing plate may range from 8% to 12%.

The fin stabilizers in the first group are connected by an annular member.

The fin stabilizers in the first group and the fin stabilizers in the second group may be both connected by an annular member.

The annular member may have a polygonal or circular shape.

The annular member may be formed by a square tube, a circular tube or a steel sheet.

The annular member may be provided to connect outer sides of ends, far away from the stabilizing plate, of the fin stabilizers and/or the annular member may pass through the fin stabilizers.

Inner sides of the fin stabilizers may be secured to the floating foundation.

A floating foundation for an offshore wind turbine is further provided according to the present application, and the floating foundation may be provided with the motion suppression device for the floating offshore wind turbine.

The floating foundation may be of a spar type or a semi-submersible type.

BRIEF DESCRIPTION OF THE DRAWINGS

The above and other objects and features of the present application will become more clearly based on the following description in conjunction with the accompanying drawings.

DETAILED DESCRIPTION OF THE PREFERRED EMBODIMENT

Embodiments of the present application will be described in detail below in conjunction with the accompanying drawings.

Figure 1:
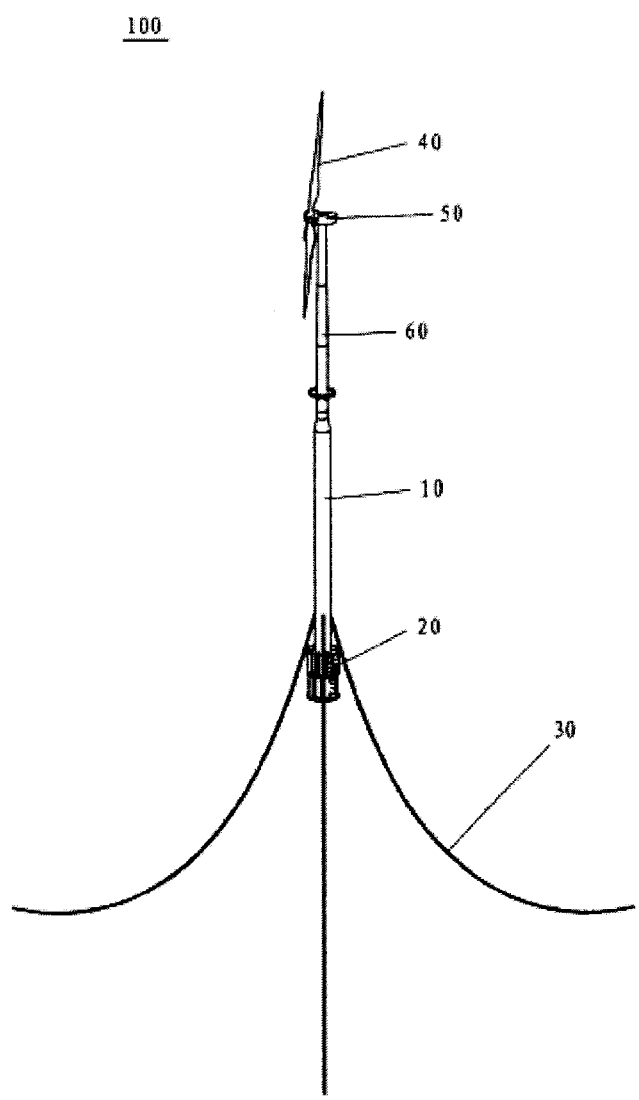
FIG. 1 is a stereogram of an offshore wind turbine with a spar type floating foundation using a motion suppression device according to a first embodiment of the present application.
Figure 2:
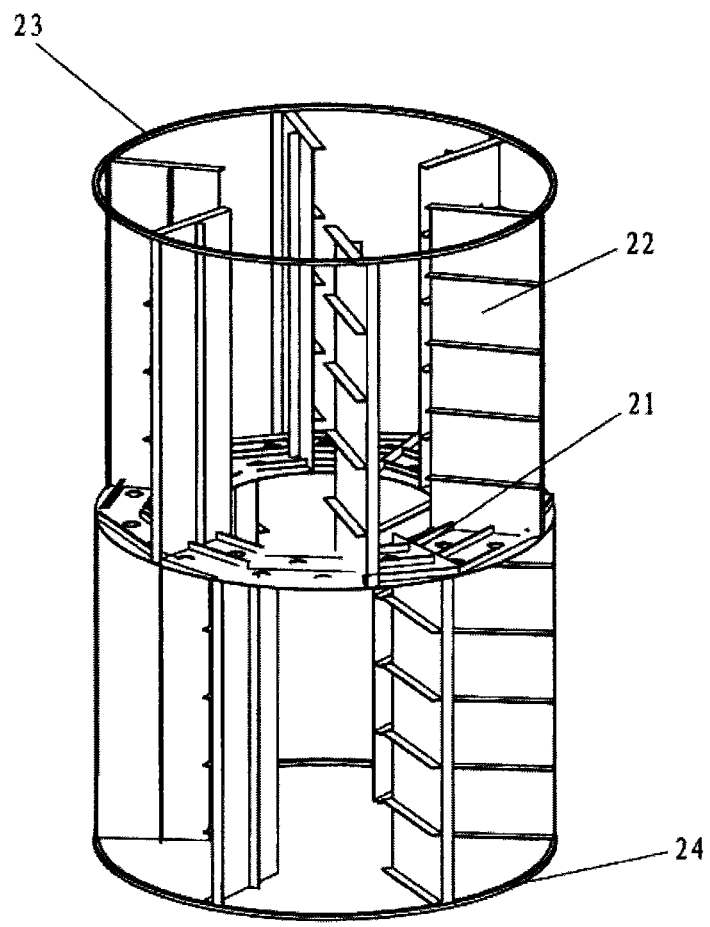
FIG. 2 is a stereogram of the motion suppression device according to the first embodiment of the present application.
Figure 3:
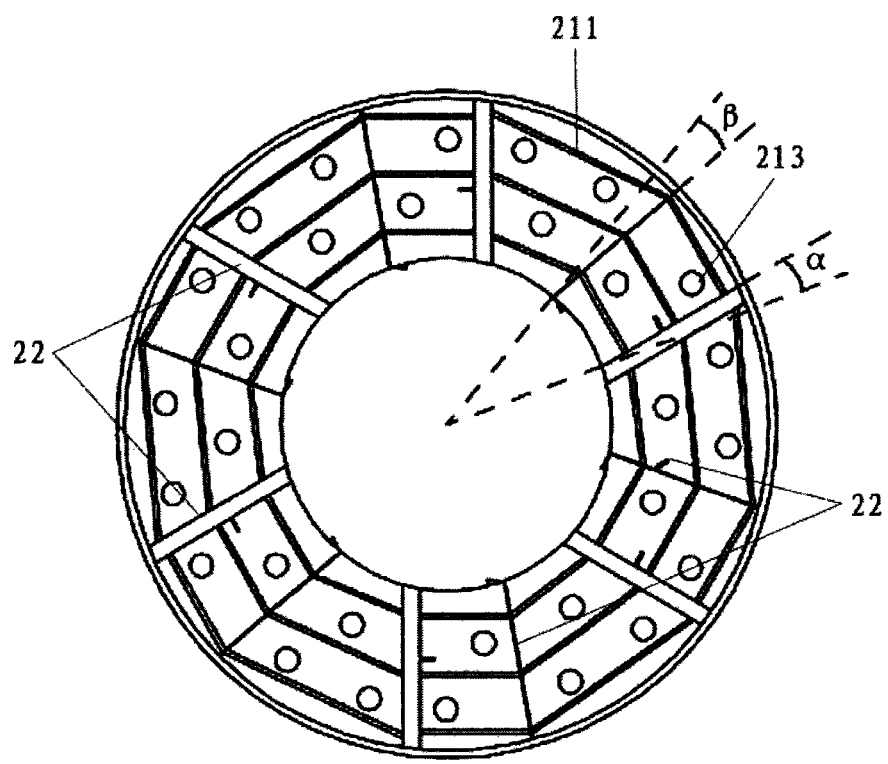
FIG. 3 and FIG. 4 are, respectively, a plan view and a stereogram of a stabilizing plate of the motion suppression device in FIG. 2.
Figure 4:
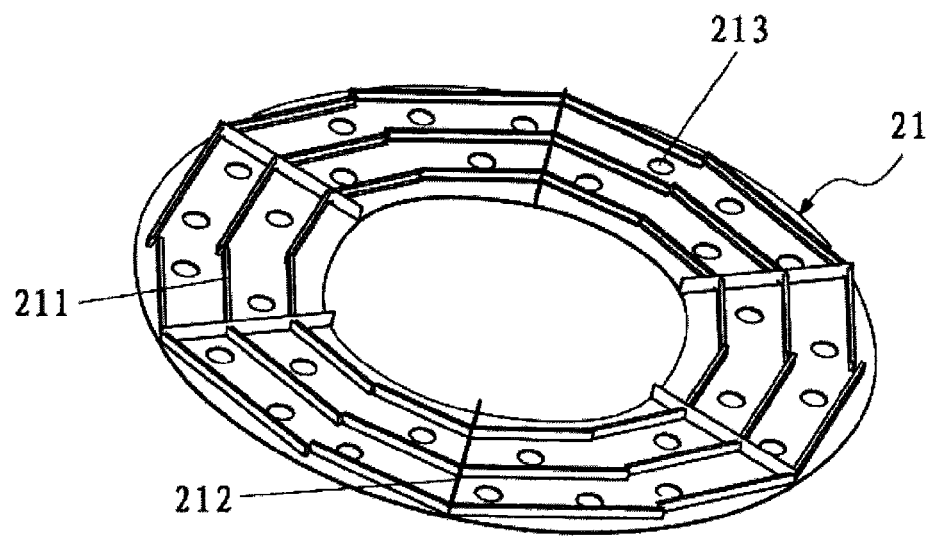
Figure 5:
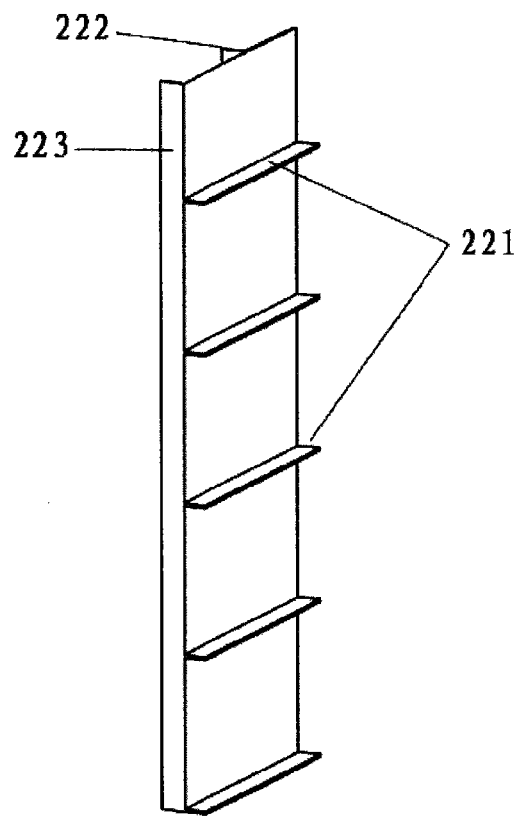
FIG. 5 is a stereogram of a fin stabilizer of the motion suppression device in FIG. 2.

FIG. 1 is a stereogram of an offshore wind turbine with a spar type floating foundation using a motion suppression device according to a first embodiment of the present application. FIG. 2 is a stereogram of the motion suppression device according to the first embodiment of the present application. FIG. 3 and FIG. 4 are, respectively, a plan view and a stereogram of a stabilizing plate of the motion suppression device in FIG. 2. FIG. 5 is a stereogram of a fin stabilizer of the motion suppression device in FIG. 2.

An offshore wind turbine with a spar-type floating foundation is taken as an example to describe the motion suppression device according to the first embodiment of the present application.

As shown in FIG. 1, an offshore wind turbine 100 with a spar type floating foundation mainly includes a spar type floating foundation 10, a motion suppression device 20, a mooring device 30, a blade 40, a nacelle 50 and a tower 60. The motion suppression device 20 is installed surrounding the floating foundation 10 and configured to reduce an overall motion magnitude of the offshore wind turbine 100, the mooring device 30 is configured to pull the floating foundation 10 and anchor it to the seabed to avoid substantial movement or overturn of the offshore wind turbine 100, the blade 40 is configured to receive wind energy and rotate to drive a rotor in the nacelle 50 to rotate so as to generate electrical energy, and the tower 60 is installed on the floating foundation 10 to support the blade 40 and the nacelle 50.

For simplicity and avoidance of vagueness of the subject matter of the present application, publicly known components will not be described herein. The structure and work principle of the motion suppression device according to the first embodiment of the present application will be described below in conjunction with FIGS. 2 to 5.

As shown in FIG. 2, the motion suppression device 20 includes an annular stabilizing plate 21 connected to the floating foundation 10. As shown in FIG. 1, the annular stabilizing plate 21 is arranged horizontally surrounding an underwater portion of the floating foundation 10, and may have a circular ring shape or a polygonal shape with a circular inner hole. The stabilizing plate 21 may be formed as a planar surface or a curved surface. The stabilizing plate is arranged around the floating foundation, which may effectively increase the damping against the rolling, pitching and heaving of the floating foundation, thereby reducing the motion magnitude of the floating wind turbine.

As shown in FIGS. 2 to 4, a plurality of circular or elliptical spoiler holes 213 may be uniformly arranged on the stabilizing plate 21. The vertical flow of fluid may be disturbed by the provided spoiler holes 213, which may effectively increase the damping against the heaving of the floating foundation, and further reduce the motion magnitude of the floating wind turbine. When the stabilizing plate 21 has a permeability of 5% to 30% due to the spoiler holes 213, the stabilizing plate 21 may increase the damping against the heaving of the floating foundation more effectively. Preferably, a permeability of 8% to 12% may achieve the best effect. In addition, the spoiler hole 213 may be of other shapes, for example triangle, square, diamond, and trapezoid.

As shown in FIG. 3, multiple turns of reinforcing flat steel may be arranged on the stabilizing plate 21 circumferentially to function as circular stiffeners 211, for example three turns of reinforcing flat steel may be arranged. Apparently, a radial stiffener 212 may be arranged on the stabilizing plate 21 radially, for example six radial stiffeners may be arranged. In addition to the circular stiffeners 211, a periphery of the stabilizing plate 21 may be provided with a flanging or a stiffener (not shown) to improve the strength of the stabilizing plate 21.

In addition, by arranging fin stabilizers 22 around the floating foundation on the stabilizing plate 21, the yawing damping and added mass of the floating foundation may be effectively increased, which may mitigate the motion of the floating wind turbine. A plurality of fin stabilizers 22 may be arranged vertically around the floating foundation on the horizontal stabilizing plate 21 and spaced apart from each other. Two groups of the fin stabilizers 22 may be respectively arranged on and below the horizontal stabilizing plate 21. However, the present application is not limited to this. The fin stabilizers 22 may be arranged only on the horizontal stabilizing plate 21 or only below the horizontal stabilizing plate 21. Preferably, the fin stabilizers 22 are uniformly spaced apart from each other.

For instance, a plurality of fin stabilizers 22 may be evenly arranged both on and below the stabilizing plate 21, and the number of the fin stabilizers 22 ranges from 4 to 10 (for example, may be 6 or 8). Preferably, each fin stabilizer 22 on the stabilizing plate and each fin stabilizer 22 below the stabilizing plate are, respectively, deflected by an angle α and an angle β with respect to a radial direction of the floating foundation (or with respect to a straight line passing through a centre of the floating foundation and an inner endpoint of the fin stabilizer). Preferably, the angle α and β may both be greater than 0 degree and less than 45 degree, and more preferably, the angle α and β may both in a range of 5 degree to 10 degree. Preferably, the angle α and the angle β are equal. Of course, the angel α and the angle β may be unequal. It has been proven in practice that, when six fin stabilizers 22 are provided in one group, the fin stabilizers with a deflection angle of 10 degree may produce a good stabilizing result. More preferably, the upper fin stabilizers 22 arranged on the stabilizing plate and the lower fin stabilizers 22 arranged below the stabilizing plate are deflected in opposite directions. Due to the deflection of the fin stabilizers 22, the fluid flow about an axis Z is subject to a higher damping effect, which effectively increases the yawing damping and added mass of the floating foundation. Additionally, since the upper fin stabilizers and the lower fin stabilizers are deflected in different directions, the yawing magnitude of the floating foundation may be significantly reduced both clockwise and anticlockwise. To adapt to the deflection angle of the fin stabilizers 22, the radial stiffeners 212 may also be deflected by an angle identical or substantially identical to that of the fin stabilizers 22.

As shown in FIGS. 2, 3 and 5, each fin stabilizer 22 extends vertically and has an L-shaped cross section. As shown in FIG. 5, outer edges of the fin stabilizer 22 are folded to form an L-shaped edgefold 223 to increase the structural stiffness and make the structure of the whole motion suppression device 20 more secure and reliable. However, the present application is not limited to this. The outer edges of the fin stabilizer 22 may also be reinforced by flat steel instead of forming the L-shaped cross section, and in this way, the structure of the whole motion suppression device 22 may also be more secure and reliable.

To improve the overall performance and reliability of the motion suppression device 20, outer sides of the fin stabilizers 22 on and below the horizontal stabilizing plate 21 may be connected, and inner sides of all the fin stabilizers 22 may be connected to the floating foundation 10 (for example, by welding or bolting). Preferably, as shown in FIGS. 2 and 3, an annular member 23 may be provided to connect the outer sides of ends, far from the horizontal stabilizing plate 21 (i.e. upper ends), of the upper fin stabilizers 22, and an annular member 24 may be provided to connect the outer sides of ends, far from the horizontal stabilizing plate 21 (i.e. bottom ends), of the lower fin stabilizers. However, the present application is not limited to this. For instance, the annular members 23 and 24 may connect the fin stabilizers 22 at their inner sides or pass through the fin stabilizers 22 to connect them. The present application may install more annular members in various manners and arrange different annular members at different locations on the fin stabilizers (for example, one annular member may be provided to connect the fin stabilizers at the inner sides or the outer sides, and another annular member may be provided to pass through the fin stabilizers to connect them). The annular members 23 and 24 may be composed of circular tubes, square tubes or steel sheets, and may have a circular or polygonal shape.

To further improve the stiffness of the motion suppression device, as shown in FIG. 5, a side surface of each fin stabilizer 22 may be provided with horizontal stiffeners 221, vertical stiffeners 222, or inclined or bent stiffeners (not shown) to enhance the structural stiffness of the fin stabilizer 22.

Although the fin stabilizer 22 in the embodiment shown in FIG. 5 is rectangular, the present application is not limited to this, and the fin stabilizer 22 may also in other flat shapes, such as triangle or trapezoid, or have a curved surface. If the floating foundation with the motion suppression device 20 has a uniform diameter, a radial width of the stabilizing plate 21 may be equal to a width of the fin stabilizer 22. If the floating foundation with the motion suppression device 20 has a non-uniform diameter, the width of the fin stabilizer 22 may vary with the diameter of the floating foundation 10. Preferably, the outer edges of the fin stabilizers 22 are flush with an outer edge of the stabilizing plate 21. Obviously, it is allowed that the outer edges of the fin stabilizers 22 are not flush with the outer edge of the stabilizing plate 21. In addition, the inner edges of the fin stabilizers 22 are preferably flush with an inner edge of the stabilizing plate 21.

The motion suppression device with two layers of fin stabilizers arranged on and below the stabilizing plate is described above in conjunction with FIGS. 1 to 6. However, the present application is not limited to this, for example one or more stabilizing plates may be provided, and one or more layers of fin stabilizers may be provided.

In the above embodiment, the whole motion suppression device is made of steel. For the wind turbine with a spar type floating foundation shown in FIG. 1, routine maintenance is not required since the wind turbine is secured to the floating foundation when the wind turbine is built.

The motion suppression device according to a second embodiment of the present application is described below in conjunction with FIGS. 6 and 7.

Figure 6:
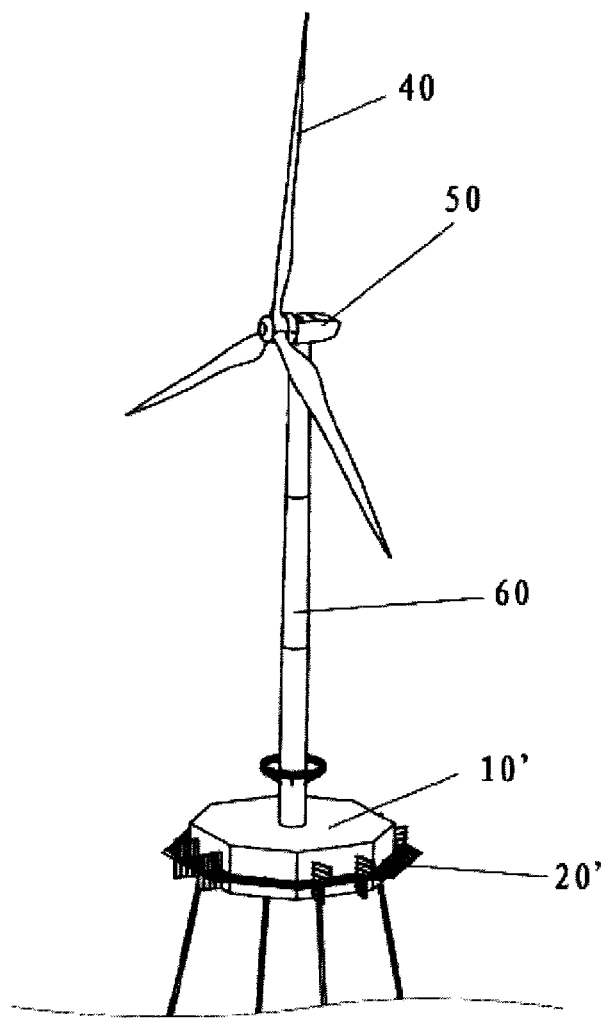
FIG. 6 is a stereogram of an offshore wind turbine with a semi-submersible floating foundation using a motion suppression device according to a second embodiment of the present application.

FIG. 6 illustrates a wind turbine 200 with a large floating foundation 10'. Due to its large size, the floating foundation may be partially submerged in the seawater, thus being referred to as a semi-submersible foundation.

Except the floating foundation 10' and a motion suppression device 20', the wind turbine 200 has basically the same structure as the wind turbine 100, thus other parts of the wind turbine will not be described in detail herein.

Figure 7:
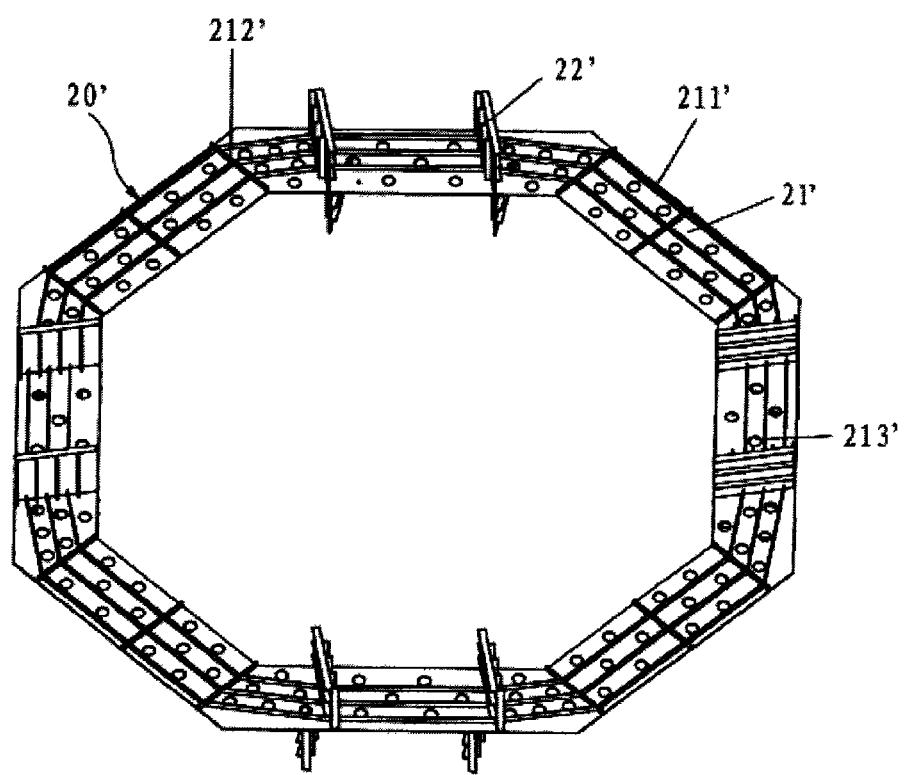
FIG. 7 is a stereogram of the motion suppression device according to the second embodiment of the present application.

As shown in FIGS. 6 and 7, the floating foundation 10' is octagonal, and correspondingly, the motion suppression device 20' surrounding the floating foundation 10' includes an annular stabilizing plate 21' arranged octagonally and two layers of fin stabilizers, respectively, arranged on and below the stabilizing plate 21'. Similar to the first embodiment, in the second embodiment, circular spoiler holes may be provided on the stabilizing plate 21'. In addition, like the first embodiment, in the second embodiment, the stabilizing plate 21' may be provided with flat steel functioning as circular stiffeners 211' and radial stiffeners 212', and the fin stabilizer 22' may be provided with flat steel or a flanging functioning as stiffeners, so as to enhance the structural strength of the motion suppression device 20' and improve the shake-reducing effect thereof.

Although the floating foundation shown in FIGS. 6 and 7 is octagonal, the motion suppression device in the present application is also applicable to semi-submersible floating foundations in other shapes, for example circular, square, pentagon, hexagon or other polygonal shapes.

Based on the above description, it is clear that, the embodiments of the present application may increase the damping against rolling, pitching, and heaving of the floating wind turbine foundation by arranging the stabilizing plate along the periphery of the floating foundation, and increase the yawing damping and added mass of the floating foundation by arranging fin stabilizers on the stabilizing plate. Additionally, spoiler holes may be provided on the stabilizing plate to disturb the vertical flow of fluid, so as to increase the heaving damping of the floating foundation. In summary, the motion suppression device of the present application may reduce the motion magnitude of the floating foundation in any direction.

Moreover, the yawing magnitude of the floating foundation may be effectively reduced by setting the two layers of fin stabilizers which deflect in opposite directions.

The motion suppression device according to the embodiments of the present application is made of conventional steel and has a simple structure, and is effective for mitigating the motion of the whole floating offshore wind turbine.

Further, the motion suppression device according to the embodiments of the present application is featured by low cost, easy fabrication and availability, which may be used for various types of floating wind turbine foundations.

Although the present application is described by exemplary embodiments, it will be readily apparent that, for the person skilled in the art, variations and modifications may be made without departing from the scope and essence of the present application defined by the Claims.

What is claimed is:

1. A motion suppression device for a floating offshore wind turbine, the floating offshore wind turbine having a floating foundation, wherein the motion suppression device comprises at least one annular stabilizing plate attached to the floating foundation and arranged horizontally surrounding the floating foundation; and the stabilizing plate is provided with a plurality of fin stabilizers comprising a first group of fin stabilizers arranged on one side of the stabilizing plate, and the first group of fin stabilizers are arranged vertically surrounding the floating foundation and spaced apart from each other; and the fin stabilizers each have an L-shaped cross section, wherein each fin stabilizer in the first group is deflected by a first angle in a width direction with respect to a straight line passing through a center of the floating foundation and an inner endpoint of the fin stabilizer, and the first angle is greater than 0 degree and less than 45 degree.

2. The motion suppression device for the floating offshore wind turbine according to claim 1, wherein the plurality of fin stabilizers further comprise a second group of fin stabilizers arranged on the other side of the stabilizing plate, and the second group of fin stabilizers are arranged vertically surrounding the floating foundation and spaced apart from each other.

3. The motion suppression device for the floating offshore wind turbine according to claim 2, wherein each fin stabilizer in the second group is deflected by a second angle in a width direction with respect to the straight line passing through the center of the floating foundation and the inner endpoint of the fin stabilizer, and both the first angle and the second angle are greater than 0 degree and less than 45 degree.

4. The motion suppression device for the floating offshore wind turbine according to claim 3, wherein the first angle and the second angle are equal.

5. The motion suppression device for the floating offshore wind turbine according to claim 3, wherein a deflection direction of the first group of fin stabilizers is opposite to a deflection direction of the second group of fin stabilizers.

6. The motion suppression device for the floating offshore wind turbine according to claim 3, wherein both the first angle and the second angle range from 5 degree to 10 degree.

7. The motion suppression device for the floating offshore wind turbine according to claim 1, wherein the fin stabilizers are each provided with a stiffener.

8. The motion suppression device for the floating offshore wind turbine according to claim 1, wherein a stiffener is provided on a surface of the stabilizing plate.

9. The motion suppression device for the floating offshore wind turbine according to claim 1, wherein the stabilizing plate is provided with evenly distributed spoiler holes.

10. The motion suppression device for the floating offshore wind turbine according to claim 9, wherein a permeability, caused by the spoiler holes, of the stabilizing plate ranges from 5% to 30%.

11. The motion suppression device for the floating offshore wind turbine according to claim 9, wherein a permeability, caused by the spoiler holes, of the stabilizing plate ranges from 8% to 12%.

12. The motion suppression device for the floating offshore wind turbine according to claim 1, wherein the fin stabilizers in the first group are connected by an annular member.

13. The motion suppression device for the floating offshore wind turbine according to claim 2, wherein the fin stabilizers in the first group and the fin stabilizers in the second group are both connected by an annular member.

14. The motion suppression device for the floating offshore wind turbine according to claim 13, wherein the annular member is provided to connect outer sides of ends, away from the stabilizing plate, of the fin stabilizers and/or the annular member passes through the fin stabilizers.

15. The motion suppression device for the floating offshore wind turbine according to claim 1, wherein inner sides of the fin stabilizers are secured to the floating foundation.

16. A floating foundation for an offshore wind turbine, wherein the floating foundation is provided with a motion suppression device for the floating offshore wind turbine, and the motion suppression device comprises at least one annular stabilizing plate attached to the floating foundation and arranged horizontally surrounding the floating foundation; and the stabilizing plate is provided with a plurality of fin stabilizers comprising a first group of fin stabilizers arranged on one side of the stabilizing plate, and the first group of fin stabilizers are arranged vertically surrounding the floating foundation and spaced apart from each other; and the fin stabilizers each have an L-shaped cross section, wherein each fin stabilizer in the first group is deflected by a first angle in a width direction with respect to a straight line passing through a center of the floating foundation and an inner endpoint of the fin stabilizer, and the first angle is greater than 0 degree and less than 45 degree.

* * * * *